United States Patent
Slik et al.

(10) Patent No.: US 9,542,415 B2
(45) Date of Patent: *Jan. 10, 2017

(54) MODIFYING INFORMATION LIFECYCLE MANAGEMENT RULES IN A DISTRIBUTED SYSTEM

(71) Applicant: NETAPP, INC., Sunnyvale, CA (US)

(72) Inventors: David Slik, Burnaby (CA); Oliver Seiler, New Westminster (CA); Pey Silvester, Port Coquitlam (CA)

(73) Assignee: NETAPP, INC., Sunnyvale, CA (US)

( * ) Notice: Subject to any disclaimer, the term of this patent is extended or adjusted under 35 U.S.C. 154(b) by 269 days.

This patent is subject to a terminal disclaimer.

(21) Appl. No.: 14/524,033

(22) Filed: Oct. 27, 2014

(65) Prior Publication Data
US 2015/0169625 A1    Jun. 18, 2015

Related U.S. Application Data

(63) Continuation of application No. 12/356,049, filed on Jan. 19, 2009, now Pat. No. 8,898,267.

(51) Int. Cl.
G06F 15/177    (2006.01)
G06F 15/173    (2006.01)
G06F 17/30    (2006.01)

(52) U.S. Cl.
CPC ... G06F 17/30215 (2013.01); G06F 17/30082 (2013.01); G06F 17/30584 (2013.01)

(58) Field of Classification Search
CPC .................. G06F 17/30215; G06F 17/30082
USPC .......................... 709/223, 221; 707/802, 809
See application file for complete search history.

(56) References Cited

U.S. PATENT DOCUMENTS

| | | |
|---|---|---|
| 3,721,757 A | 3/1973 | Ettlinger |
| 4,562,534 A | 12/1985 | Zandveld et al. |
| 5,428,769 A | 6/1995 | Glaser et al. |
| 5,475,706 A | 12/1995 | Kobayashi et al. |
| 5,504,883 A | 4/1996 | Coverston et al. |
| 5,522,077 A | 5/1996 | Cuthbert et al. |

(Continued)

FOREIGN PATENT DOCUMENTS

WO    2004104866 A2    12/2004

OTHER PUBLICATIONS

All office actions, amendments, arguments, and other relevant documents or materials in the file history of co-pending U.S. Appl. No. 11/440,240, filed Apr. 10, 2006, entitled "Content Distribution System for Generating Content Streams to Suit Different Users and Facilitating E-Commerce Transactions Using Broadcast Content Metadata", Corrected application info: U.S. Appl. No. 09/493,087, filed Jan. 28, 2000.

(Continued)

Primary Examiner — Madhu Woolcock
(74) Attorney, Agent, or Firm — Gilliam IP PLLC

(57) ABSTRACT

A system and method for specifying the placement of and managing the placement of objects on a distributed networked grid. Some embodiments of the invention comprise a user interface for specifying rules for the placement of objects on the grid and an execution module that places objects on the grid based on the rules specified. Rules may comprise a matching criteria specification, which determines whether a rule applies to a particular object, and a placement specification, which directs the locations at which an object will be placed under the rule.

21 Claims, 11 Drawing Sheets

(56) References Cited

U.S. PATENT DOCUMENTS

| | | | |
|---|---|---|---|
| 5,634,052 A | 5/1997 | Morris | |
| 5,729,738 A | 3/1998 | Watanabe et al. | |
| 5,778,395 A | 7/1998 | Whiting et al. | |
| 5,806,075 A | 9/1998 | Jain et al. | |
| 5,845,080 A | 12/1998 | Hamada et al. | |
| 5,890,156 A | 3/1999 | Rekieta et al. | |
| 6,356,563 B1 | 3/2002 | Nicoll et al. | |
| 6,535,864 B1 | 3/2003 | Zahn | |
| 6,567,818 B1 | 5/2003 | Frey et al. | |
| 6,735,220 B1 | 5/2004 | Shirriff | |
| 6,772,209 B1 | 8/2004 | Chernock et al. | |
| 6,775,668 B1 | 8/2004 | Goel | |
| 6,779,082 B2 | 8/2004 | Burger et al. | |
| 6,782,389 B1 | 8/2004 | Chrin et al. | |
| 6,832,227 B2 | 12/2004 | Seki et al. | |
| 6,898,589 B2 | 5/2005 | Erdmenger et al. | |
| 6,947,959 B1* | 9/2005 | Gill | G06F 17/30011 707/999.003 |
| 6,976,165 B1 | 12/2005 | Carpentier et al. | |
| 7,000,141 B1 | 2/2006 | Karlsson et al. | |
| 7,027,463 B2 | 4/2006 | Mathew et al. | |
| 7,028,071 B1 | 4/2006 | Slik | |
| 7,127,475 B2 | 10/2006 | Gotz et al. | |
| 7,143,105 B2 | 11/2006 | Nakano et al. | |
| 7,143,251 B1 | 11/2006 | Patterson | |
| 7,171,434 B2 | 1/2007 | Ibrahim et al. | |
| 7,222,176 B1 | 5/2007 | Laurent et al. | |
| 7,237,079 B2 | 6/2007 | Kaneda et al. | |
| 7,299,250 B2 | 11/2007 | Douceur et al. | |
| 7,343,459 B2 | 3/2008 | Prahlad et al. | |
| 7,376,764 B1 | 5/2008 | Todd | |
| 7,392,261 B2 | 6/2008 | Clark et al. | |
| 7,403,901 B1 | 7/2008 | Carley et al. | |
| 7,505,586 B2 | 3/2009 | Schmidt | |
| 7,509,524 B2 | 3/2009 | Patel et al. | |
| 7,546,486 B2 | 6/2009 | Slik et al. | |
| 7,577,724 B1 | 8/2009 | Jalagam et al. | |
| 7,590,672 B2 | 9/2009 | Slik et al. | |
| 7,606,825 B1* | 10/2009 | Pai | G06F 17/30 |
| 7,624,158 B2 | 11/2009 | Slik et al. | |
| 7,664,794 B2 | 2/2010 | Kasmirsky et al. | |
| 7,814,054 B2 | 10/2010 | Laurion | |
| 7,849,282 B2 | 12/2010 | Nonaka et al. | |
| 7,885,936 B2 | 2/2011 | Austin et al. | |
| 7,899,850 B2 | 3/2011 | Slik et al. | |
| 7,904,570 B1 | 3/2011 | Kroupa | |
| 7,953,614 B1* | 5/2011 | Reicher | G06Q 10/10 705/2 |
| 8,156,281 B1 | 4/2012 | Grosner et al. | |
| 8,271,548 B2* | 9/2012 | Prahlad | G06F 17/30528 707/812 |
| 8,635,594 B1* | 1/2014 | Krishnan | G06F 9/45512 707/609 |
| 2002/0035638 A1 | 3/2002 | Gendron et al. | |
| 2002/0133491 A1 | 9/2002 | Sim et al. | |
| 2002/0133515 A1 | 9/2002 | Kagle et al. | |
| 2003/0040854 A1 | 2/2003 | Rendahl et al. | |
| 2003/0046270 A1* | 3/2003 | Leung | G06F 17/30575 |
| 2003/0115204 A1* | 6/2003 | Greenblatt | H04L 41/0816 |
| 2003/0149709 A1 | 8/2003 | Banks | |
| 2003/0172239 A1 | 9/2003 | Swank | |
| 2003/0204420 A1 | 10/2003 | Wilkes et al. | |
| 2004/0054569 A1 | 3/2004 | Pombo et al. | |
| 2004/0122849 A1 | 6/2004 | Nelson | |
| 2004/0122946 A1 | 6/2004 | Hu et al. | |
| 2004/0123062 A1* | 6/2004 | Dalal | G06F 3/0605 711/170 |
| 2004/0139222 A1 | 7/2004 | Slik et al. | |
| 2004/0153739 A1 | 8/2004 | Trimmer et al. | |
| 2004/0199566 A1 | 10/2004 | Carlson et al. | |
| 2004/0230317 A1* | 11/2004 | Kumar | G06F 3/0605 700/1 |
| 2004/0243997 A1 | 12/2004 | Mullen et al. | |
| 2004/0267689 A1 | 12/2004 | Gavlak et al. | |
| 2005/0010529 A1 | 1/2005 | Zalewski et al. | |
| 2005/0021566 A1 | 1/2005 | Mu | |
| 2005/0114611 A1 | 5/2005 | Durham et al. | |
| 2005/0120025 A1 | 6/2005 | Rodriguez et al. | |
| 2005/0195660 A1 | 9/2005 | Kavuri et al. | |
| 2005/0216428 A1 | 9/2005 | Yagawa | |
| 2005/0232210 A1* | 10/2005 | Karaoguz | G06F 17/30038 370/338 |
| 2005/0246311 A1 | 11/2005 | Whelan et al. | |
| 2006/0004689 A1 | 1/2006 | Chandrasekaran et al. | |
| 2006/0004820 A1 | 1/2006 | Claudatos et al. | |
| 2006/0010169 A1 | 1/2006 | Kitamura | |
| 2006/0026219 A1 | 2/2006 | Orenstein et al. | |
| 2006/0080362 A1 | 4/2006 | Wagner et al. | |
| 2006/0136691 A1 | 6/2006 | Brown et al. | |
| 2006/0190358 A1 | 8/2006 | Slik | |
| 2007/0022129 A1 | 1/2007 | Bahar et al. | |
| 2007/0083575 A1* | 4/2007 | Leung | G06F 17/30082 |
| 2007/0094316 A1 | 4/2007 | Rodriguez et al. | |
| 2007/0220320 A1 | 9/2007 | Sen et al. | |
| 2007/0294310 A1 | 12/2007 | Yagawa | |
| 2008/0016081 A1* | 1/2008 | MacMillan | G06F 17/30035 |
| 2008/0016196 A1* | 1/2008 | MacMillan | G06F 17/30017 709/223 |
| 2008/0059746 A1 | 3/2008 | Fisher | |
| 2008/0235247 A1 | 9/2008 | Krantz et al. | |
| 2008/0270698 A1 | 10/2008 | Shirogane et al. | |
| 2009/0018866 A1 | 1/2009 | Christen | |
| 2009/0030953 A1 | 1/2009 | Fukuda et al. | |
| 2009/0089340 A1 | 4/2009 | Ohr et al. | |
| 2009/0240713 A1 | 9/2009 | Jia et al. | |
| 2010/0082513 A1 | 4/2010 | Liu | |
| 2011/0125814 A1 | 5/2011 | Slik et al. | |

OTHER PUBLICATIONS

All office actions, amendments, arguments, and other relevant documents or materials in the file history of co-pending U.S. Appl. No. 12/552,173, filed Sep. 1, 2009, entitled "Time Optimized Secure Traceable Migration of Massive Quantities of Data in a Distributed Storage System".

All office actions, amendments, arguments, and other relevant documents or materials in the file history of co-pending U.S. Appl. No. 13/014,659, filed Jan. 26, 2011, entitled "Relational Objects for the Optimized Management of Fixed-Content Storage Systems".

All office actions, amendments, arguments, and other relevant documents or materials in the file history of U.S. Appl. No. 10/341,360, filed Jan. 14, 2003, entitled "Method and Apparatus for Transmission and Storage of Digital Medical Data".

All office actions, amendments, arguments, and other relevant documents or materials in the file history of U.S. Pat. No. 7,546,486 entitled "Scalable Distributed Object Management in a Distributed Fixed Content Storage System," filed on Aug. 28, 2006.

All office actions, amendments, arguments, and other relevant documents or materials in the file history of U.S. Pat. No. 7,590,672 entitled "Identification of Fixed Content Objects in a Distributed Fixed Content Storage System," filed on Dec. 11, 2006.

All office actions, amendments, arguments, and other relevant documents or materials in the file history of U.S. Pat. No. 7,899,850 entitled "Relational Objects for the Optimized Management of Fixed-Content Storage Systems," filed Feb. 22, 2008.

Alspaugh, et al., "Data Management for Distributed Scientific Collaborations Using a Rule Engine," Department of Computer Science, University of Virginia, Information Sciences Institute, University of Southern California, 2008, 9 pages.

Brocade Communications Systems, Inc., "Maximizing Efficiency in Block-Level Data Migration," Storage Area Network, San White Paper, Apr. 2007, pp. 1-9, (04/07 GA-WP-861-00).

Chervenak, et al., "A Data Placement Service for Petascale Applications," USC Information Sciences Institute, Marina Del Rey, CA, Nov. 2007, 6 pages.

Chervenak, et al., "Data Placement for Scientific Applications in Distributed Environments," USC Information Science Institute,

(56) References Cited

OTHER PUBLICATIONS

Marina Del Rey, CA, Computer Science Department, University of Wisconsin Madison, Madison, WI, Sep. 2007, 8 pages.
Chu et al., "The Exclusive-Writer Protocol: A Low Cost Approach for Updating Replicated Files in Distributed Real Time Systems," Proc. 3rd Int. Conf. Distrib. Comput. Syst., Oct. 1982, pp. 219-220.
Cooper, et al., "Implementing a Reliable Digital Object Archive," Department of Computer Science, Stanford University, Jun. 2000, pp. 1-12.
Elson J., et al., "Random, Ephemeral Transaction Identifiers in Dynamic Sensor Networks," Department of Computer Science, University of California, Los Angeles, 2001, 10 pages.
Herman D., "Towards a Systematic Approach to Implement Distributed Control of Synchronization," Distributed computing Systems, 1983, pp. 50-51, 54-55.
Howard P., "Data Migration," A White Paper by Bloor Research, Oct. 2007, pp. 1-15.
International Search Report and Written Opinion for Application No. PCT/IB2007/004346 mailed on Sep. 9, 2008, 11 pages.
International Search Report and Written Opinion for Application No. PCT/IB2007/004580 mailed on Dec. 4, 2008, 12 pages.
Introduction to iRods, www.irods.org, Sep. 2008, 5 pages.
ISO/IEC 11578, Information Technology-Open Systems Interconnection-Remote Procedure Call, RPCI, 1996, pp. 533-538.
Ko B., et al., Distributed, Self-Stabilizing Placement of Replicated Resources in Emerging Networks, Department of Electrical Engineering, Columbia University, New York, NY, 2003, 10 pages.
Lecture Notes in Compute Science, 1981, vol. 105, pp. 194-197, 202-203, 300-301.
Lippman, "Asymmetric Coding of Motion Picture Sequences," MIT Media Lab, Jun. 1998, 3 pages.
Little, et al., "The Replica Management System: A Scheme for Flexible and Dynamic Replication," Department of Computing Science, University of Newcastle upon Tyne, Newcastle upon Tyne, UK, and Xerox Corporation, Webster, NY, Mar. 1994, pp. 1-12.
Lo S-L., "A Modular and Extensible Network Storage Architecture," Cambridge University Press, 1995, pp. 51, 53-54.
Lu, et al., "Aqueduct: Online Data Migration With Performance Guarantees," Proceedings of the FAST 2002 conference on File and Storage Technologies (FAST '02), Monterey, CA (USENIX, Berkeley, CA), Jan. 28-30, 2002, pp. 219-230.
Lubeck, et al., "An Overview of a Large-Scale Data Migration," Database Group, IT Division, European Organization for Nuclear Research (CERN), Jan. 17, 2003, 7 pages.
Ma K., et al., "Web-based Monitoring and Management System for Integrated Enterprise Wide Imaging Networks," Medical Imaging 2003, PACS and Integrated Medical Information Systems: Design and Evaluation, vol. 5033, pp. 160-171.
Manivannan, et al., "A Decentralized Token Generation Scheme for Token-Based Mutual Exclusion Algorithms," International Journal of Computer Systems Science and Engineering, Jan. 1996, vol. 11 (1), pp. 45-54.
McCue, et al., "Computing Replica Placement in Distributed Systems," IEEE Second Workshop on Replicated Data, Computing Laboratory, University of Newcastle Upon Tyne, Monterey, Nov. 1992, pp. 58-61.
Milenkovic M., "Update Synchronization in Multiaccess Systems," Distributed database systems, No. 8, 1979, pp. 2-3, 8-11, 32-35.
Moore, et al., "Policy Core Information Model—Version 1 Specification," The Internet Society, 2001, pp. 1-100.
Nirvanix Datasheet, (NDS-INGESTIONSERVICES-1108), Nov. 5, 2008, 2 pages.
Silk, et al., "A Comprehensive Security Framework for the Communication and Storage of Medical Images," Medical Imagining 2003: PACS and Integrated Medical Information Systems: Design and Evaluation, SPIE, May 2003, vol. 6033, pp. 212-223.
Slik D., et al., "Scalable Fault Tolerant Image Communication and Storage Grid," SPIE USE, V.2 5033-7, Jan. 17, 2003, pp. 36-47.
Sollins, et al., "Functional Requirements for Uniform Resource Names," RFC 1737 , Dec. 1994, pp. 1-7.
SureSync Evaluators Guide, Software Pursuits, Inc., 2006, 21 pages.
Terry, et al., "The Case for Non-transparent Replication: Examples from Bayou," Computer Science Laboratory, Xerox Palo Alto Research Center, Palo Alto, CA, 1998, 10 pages.
The Hidden Costs of Data Migration, IBM Global Technology Services, Dec. 2007, pp. 1-12 (GTW01279-USEN-01).
U.S. Appl. No. 13/782,056, filed Mar. 1, 2013, 55 pages.

* cited by examiner

MODIFYING INFORMATION LIFECYCLE MANAGEMENT RULES IN A DISTRIBUTED SYSTEM

CROSS-REFERENCE TO RELATED APPLICATIONS

This application is a continuation of, claims the benefit of and priority to U.S. patent application Ser. No. 12/356,049, entitled "Modifying Information Lifecycle Management Rules in a Distributed System" filed Jan. 19, 2009, the subject matter of which is incorporated herein by reference in its entirety.

BACKGROUND

The invention relates generally to the field of storage management, and more particularly to information storage management in distributed network systems.

Businesses and other organizations have a need to store information on multiple computer storage systems in order to ensure the reliability and availability of that information. Typically such computer storage systems are connected by some network to form a "grid" of computers. The grid may maintain numerous "objects," or packages of data that are potentially structured and/or associated with metadata.

With such a grid, there is a problem of where to place a given object, either on the grid or somewhere external to it. Placement may be dictated by economic, physical, legal, or other considerations, which are often specific to the particular business or organization that is using the Cgrid. Moreover, during the lifecycle of an object, its placement may change over time based on the above considerations. Manually managing placement of objects over time can be a difficult, time-consuming, and error-prone task.

Thus, there is a need for a system and method that permits users to specify rules for placement of objects and that automatically stores objects in accordance with those rules. By creating this interface and allowing it to drive object placement, the invention significantly reduces deployment costs, improves the flexibility of configuration and increases the value of file management for the end customer.

SUMMARY OF THE INVENTION

The disclosure herein presents an improvement to information lifecycle management, allowing users to configure rules governing the placement of objects on the grid. The system then is capable of using those user-generated rules to place objects on the grid in appropriate locations.

The embodiments described below permit users to specify rules for the placement of objects on the grid. Users can provide information as to which objects fall under a given rule, by specifying attributes of objects, such as its metadata, to be matched against the rule. Users can then specify the placement of objects under a rule. Placement may include the storage devices at which the object is to be stored, the classes of storage, the number of copies to store, and the length of time to retain the object at each storage device.

Described below, as well, is a system and method for carrying out these user-specified rules. The described embodiments determine which objects match a given rule, based on the objects' metadata and other attributes. Then, objects that are not correctly placed on the grid in accordance with the rule are moved to their correct locations or queued for evaluation if the correct locations are unavailable at the time.

DETAILED DESCRIPTION OF THE PREFERRED EMBODIMENT

Disclosed herein is a storage grid system that provides storage services to external applications. Applications package data that is to be stored into discrete objects, which are submitted to the grid along with associated metadata as part of an initial storage process. This initial storage process is known as "ingest." Objects may be ingested by clients of the system.

In some embodiments, objects can be ingested into the grid directly by clients via an HTTP API, or indirectly via a "Gateway." Examples of gateways are the File System Gateway, which provides standard CIFS/NFS access for clients, and the DICOM Gateway, which provides DICOM protocol access for clients.

According to some embodiments of the present invention, once an object has been ingested, the storage grid system provides the management of the object over time. Management may involve ensuring that the object is reliably stored for the required duration, is protected against failures, and/or has the Quality of Service (QoS) characteristics that are desired.

Object management activities can be broken down into three categories: Retention, Placement and Notification.

Retention involves the length of time that the object should be stored, and if it is permissible to alter or delete the object.

Placement involves where the object is stored. By varying the placement of the object, higher degrees of reliability can be obtained, while retrieval performance (latency and throughput) can be altered by placing the object on different grades of storage resources or closer to the point of access.

Notification involves sending information about the object to a named destination, which can be internal (within the grid) or external from the grid.

These activities are controlled by the information lifecycle management rules for the object, of which placement rules are an example of one specific type of rule.

Figure 1:
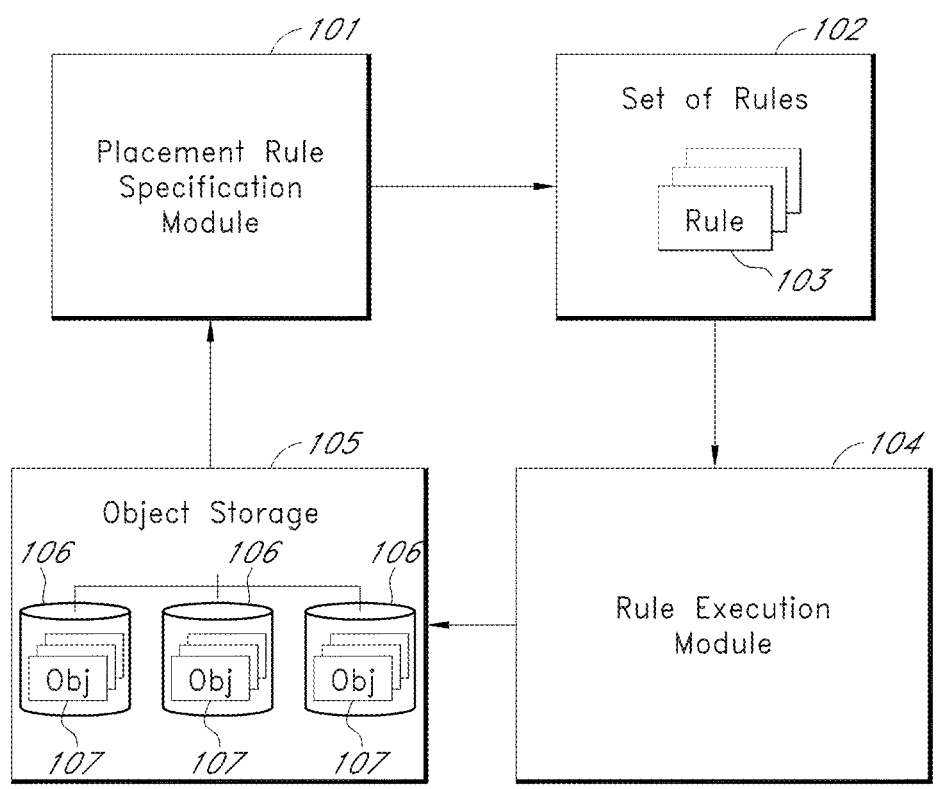
FIG. 1 depicts exemplary modules in one embodiment.

FIG. 1 illustrates the modules present in some embodiments of the present invention. Such a system comprises a placement rule specification module 101, a set of placement rules 102, a rule execution module 104, and an object storage grid 105.

The system maintains a list of placement rules 103 within its set of rules 102. In some embodiments, this list is ordered or ranked. The system also maintains an object storage grid 105, which comprises one or more storage devices 106. In various embodiments these storage devices may be computers, network-attached storage devices, tape drives, or other such devices. Each device 106 stores zero or more objects 107.

The placement rule specification module 101 uses information about the topology, utilization and other properties of the object storage grid 105 and allows users to augment, diminish, or modify the set of rules 102. The rule execution module 104 takes the set of rules 102 as input and directs the placement of new and existing objects 107 to appropriate storage devices 106 as dictated by the placement rules.

Figure 2:
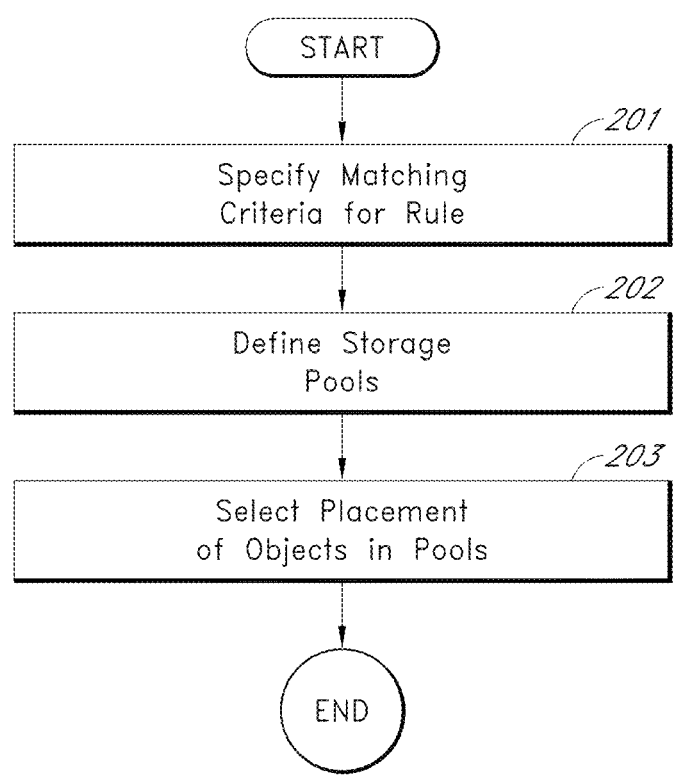
FIG. 2 is a flowchart of an exemplary process by which a user may specify an object placement rule.

In some embodiments, a user creates a placement rule by the method of FIG. 2. First, the user specifies matching criteria for the rule 201. As described in detail below, matching criteria determine the objects to which a rule will apply. Next, the user defines one or more storage pools, or groups of storage devices 202. In some embodiments, storage pools will be defined for a particular placement rule; in other embodiments, storage pools will be defined independently of placement rules. Additionally, in some embodiments storage pools will not be necessarily used, and users will specify directly the placement on storage devices.

The user next selects the storage pools in which objects will be placed under this rule 203. In some embodiments users will also specify a number of copies of the object to be placed in each pool and a time period during which the object will be retained in the pool.

Figure 3:
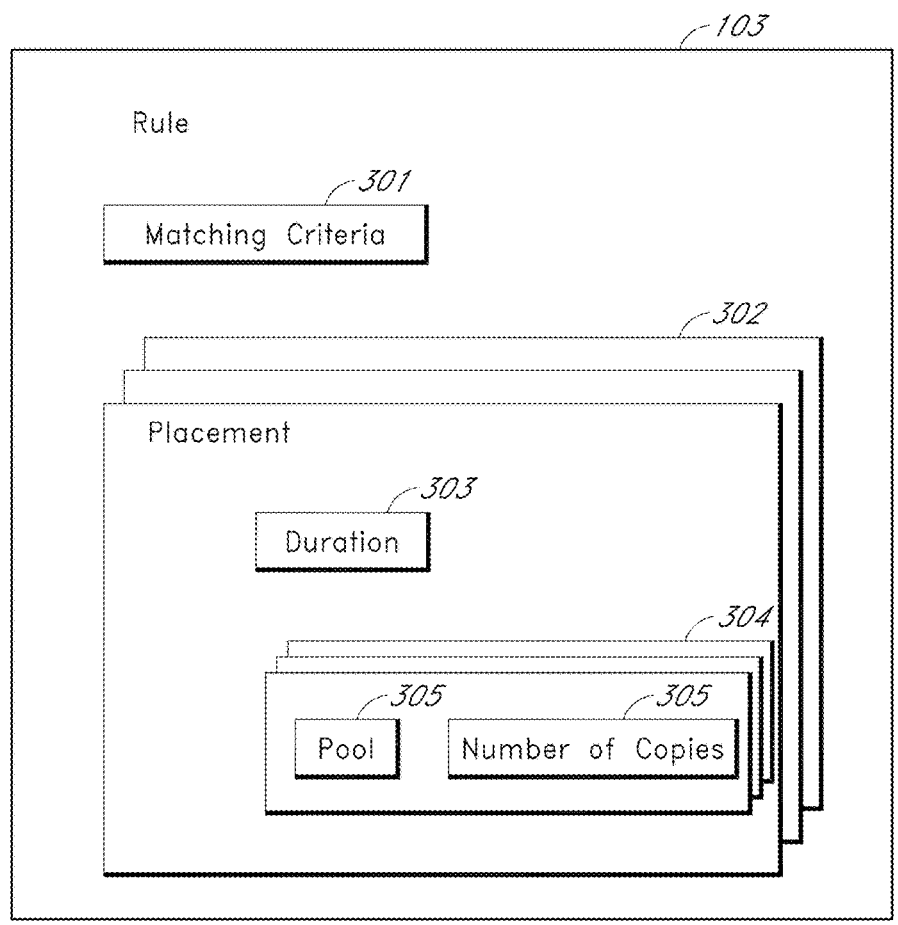
FIG. 3 illustrates an exemplary composition of a placement rule.

In some embodiments, placement rules comprise the elements depicted in FIG. 3. A rule 103 comprises a matching criteria specification 301 and one or more placement specifications 302. A placement specification comprises a duration period 303 and one or more pool specifications 304, each of which comprises a reference to a storage pool 305 and a number of copies to place in that storage pool 306. It will be understood that, in different embodiments of the invention, a placement rule may comprise these or other elements in this or other arrangements. For example, in some embodiments a placement rule may be associated with a name. In other embodiments, the placement specification may optionally contain safety placement destinations, used to place matching objects during the process of evaluating the rule.

Figure 4:
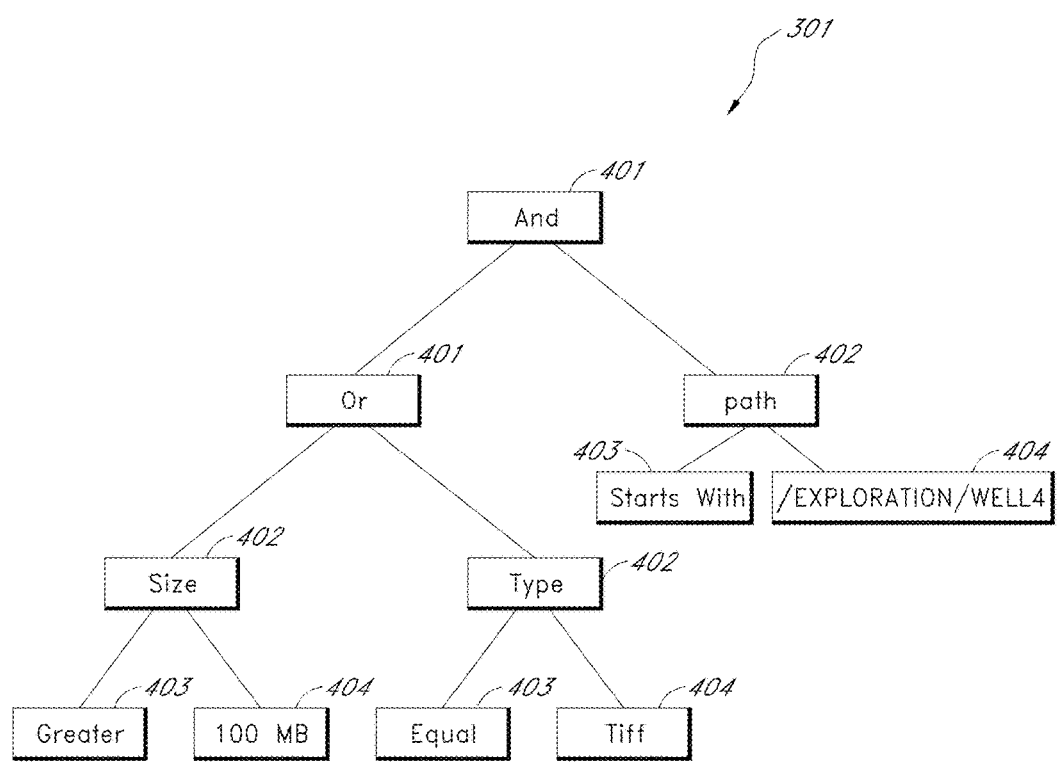
FIG. 4 presents an example matching criteria tree for a particular embodiment of a placement rule.

FIG. 4 depicts an example matching criteria specification 301. The matching criteria specification here is stored in a tree form, used in some embodiments of the present invention. Metadata matching criteria is specified as a set of logical functions, $f(a, b, c)$, where a is the metadata associated with the object 402, b is the matching criteria operator 403, and c are zero or more parameters to the matching criteria 404. The matching criteria operator b is defined as a logical statement which operates on a single metadata item and performs a primitive operation (including but not limited to exists, equal, greater than, less than, greater than and equal to, less than or equal to, includes, like, after, before, within, offset from, and so forth), several of which may be combined into a larger logical tree by a series of logical operators 401 such as AND, OR, and NOT. Although FIG. 4 depicts a matching criteria specification with several matching criteria, a matching criteria specification may contain one or even zero matching criteria. A matching criteria specification with no matching criteria may be interpreted, in various embodiments, to be always true or, in other embodiments, to be always false. Those skilled in the art will appreciate that the matching criteria specification need not be in this particular tree form, but may be another tree structure, a series of procedural calls, a FORTH or stack-based notation, a compiled byte code, or any other format of similar function.

The matching criteria specification may specify which metadata/value matches must be true for the rule to apply. It also may define which object states the rule applies to. For example, if a file has been deleted from the File System Gateway or released via the HTTP API, the object can be managed by a different rule than if it has not been deleted or released.

When an object is first ingested, and each time a subsequent event occurs, the matching criteria for each rule is checked starting from the highest to the lowest ranked rule, and when a complete match is found, the matching rule is used to control retention, notification and placement. Some embodiments may cache the last matching rule for an object to reduce processing required when rules have not been changed.

FIGS. 5 through 8 present exemplary user interfaces allowing for users to input rules into the system. Although the embodiments described herein present this interface as implemented through an HTTP API, the invention is not limited to such an interface, as those skilled in the art will appreciate that it may be implemented as a command-line interface, a XML control document, a standalone application, a Remote Procedure Call (RPC) system, or other interface with similar function.

Once the rules are specified in the user interface, the rules are summarized into a tree data structure such as that in 102 and 103 and stored by the system. In some embodiments, this configuration data structure may be then distributed to components within the grid, where it is acted upon when objects are evaluated for processing.

When rules are changed through the configuration interface, objects can optionally be re-evaluated to move them to the updated locations. This re-processing of objects on a rules change may occur in the foreground as a high-priority task or in the background as a low priority task.

The same approach for specifying rules for content placement is also directly applicable to content retention and external system notifications. Using common criteria for applying to objects, behaviours related to retention and notifications can be performed on objects at various points during their lifespan.

Figure 5:
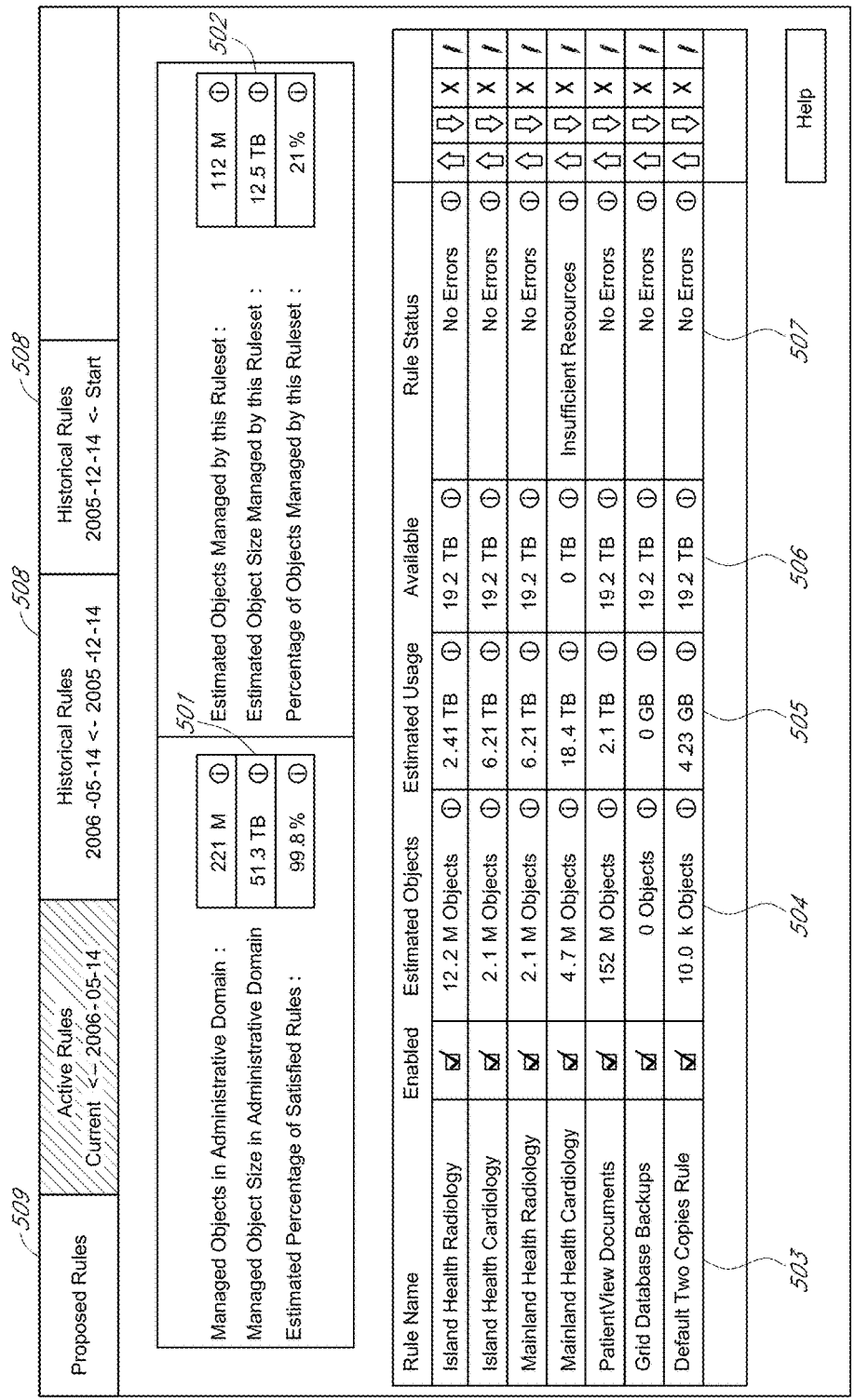
FIG. 5 depicts an example user interface for managing placement rules.

FIG. 5 presents an example of a possible user interface depicting an overview of placement rules. On a periodic or continuous basis, a representatively sampled collection of metadata associated with stored objects is collected from the grid and is transformed and processed into a form that can be used to predict the impact of rules on the placement and storage of objects in the grid. This is shown above in the estimates of the number of objects and the estimates of the storage usage of the objects, both for the entire system 501 and for a particular Ruleset 502. In various embodiments, a Ruleset may be one or more rules selected by the user or one or more rules displayed by the user interface. Those skilled in the art will appreciate that other definitions of a Ruleset are possible.

Each placement rule is presented with its name 503, an estimated number of objects matching the rule 504, an estimated amount of storage space consumed by objects matching the rule 505, and an estimated amount of storage space available for new objects matching the rule 506. Based on the placement rules expressed, when placement for objects cannot be achieved, the administrator can be informed of this by indicating which rule cannot be met, and why. The Rule Status 507 displays this information.

In some embodiments, the interface also allows for the viewing and reverting to historical rules 508, and viewing over what period of time historical rules were in force. New rules that are proposed can be created in a separate "sandbox" 509 where they can be created and tested without impacting production storage operations.

Figure 6:
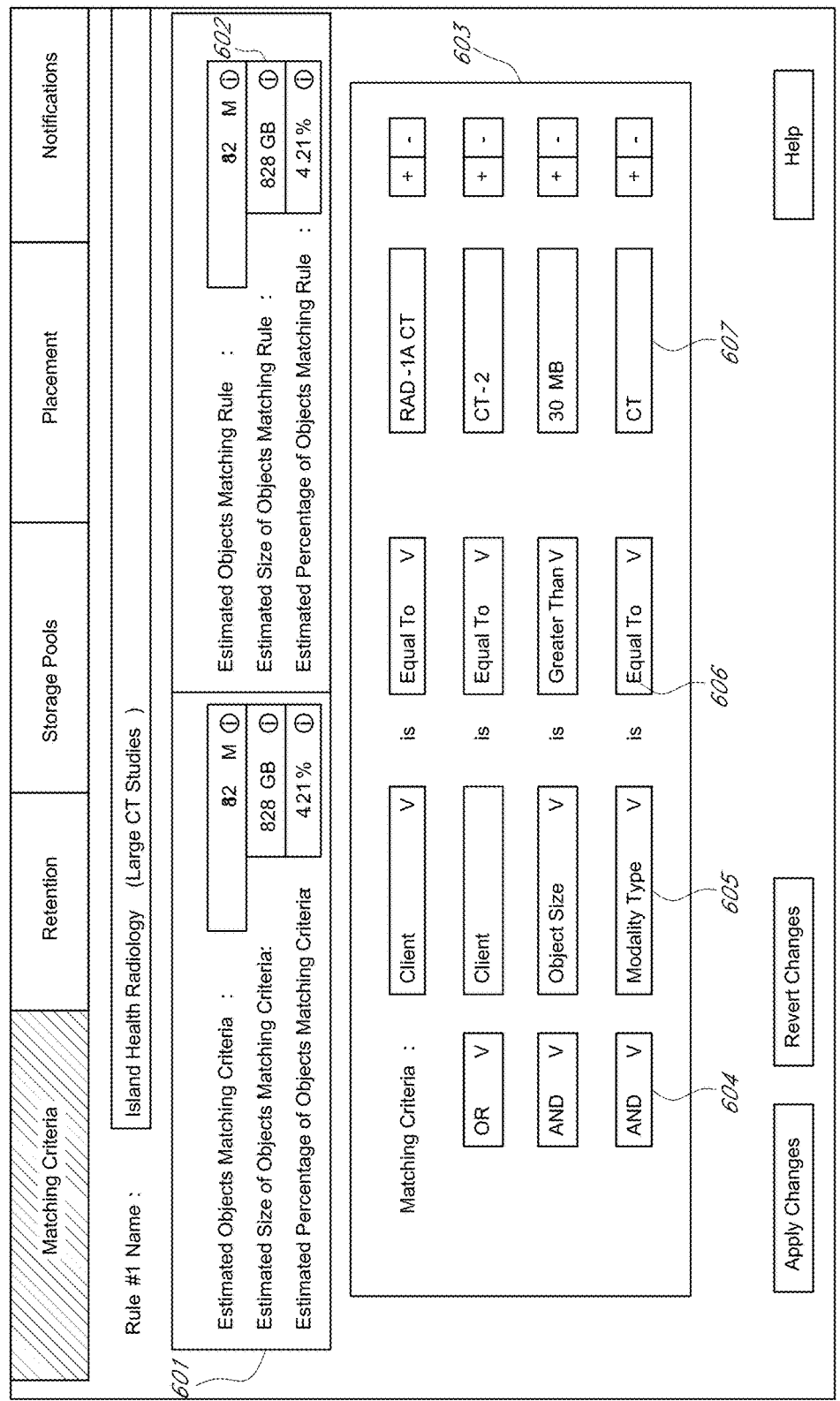
FIG. 6 depicts an example user interface for specifying the matching criteria for a placement rule.

An example of a possible user interface for specifying the matching criteria for a given rule that determines which objects are to be managed by the rule is shown below in FIG. 6.

While editing rule matching criteria, the number and estimated size of objects that match the criteria 601 and the number and estimated size of objects that match the rule 602 can be estimated dynamically as the criteria are changed. These are distinct because the rule evaluation priority ultimately determines which rule may be applied to a given object. For example, in one embodiment of rule prioritization, if rule matching criteria overlaps between multiple rules, then for the overlapping set, the rule higher on an evaluation order matches first.

The portion of the interface for specifying matching criteria 603 comprises interfaces for specifying one or more logical operators 604, metadata field names 605, matching criteria operators 606, and parameters to the matching criteria operators 607. For String-type metadata, possible matching criteria operators may include Equals, Starts with, Ends with, POSIX regular expression, Perl-compatible regular expression, ANSI SQL Like, and Contains. For Numeric-type metadata, possible matching criteria operators may include Equal, Greater, Less, Greater than or equal, Less than or equal, Within, and Outside. For Date-time-type metadata, possible matching criteria operators may include Before, After, At, and Between.

Additional matching criteria operators will be apparent to those knowledgeable in the art.

Once a matching placement rule has been identified for a given object based on the rule's matching criteria, the placement of that object is managed based on a series of constraints as mapped onto the real-time topology of the grid.

In some embodiments, each storage resource on the grid has the information about itself, including a hierarchical or tagged location within the grid topology, and a storage grade that identifies the type and class of storage provided. In some embodiments, a series of storage pools are defined, where each storage pool consists of a set of resources defined by grade and topology constraints. Each desired placement criteria is defined and named by specifying the number of copies, and the desired grouping and grade criteria for those copies. Once the named placement criteria have been defined, they are mapped to a series of times within the object's lifecycle.

Placement timeframes may include relative duration from ingest time, relative duration from last access time, relative duration from a named notification event, indefinite duration until absolute time, and indefinite duration until a named notification event. Those skilled in the art will appreciate that other placement timeframes are possible.

Figure 7:
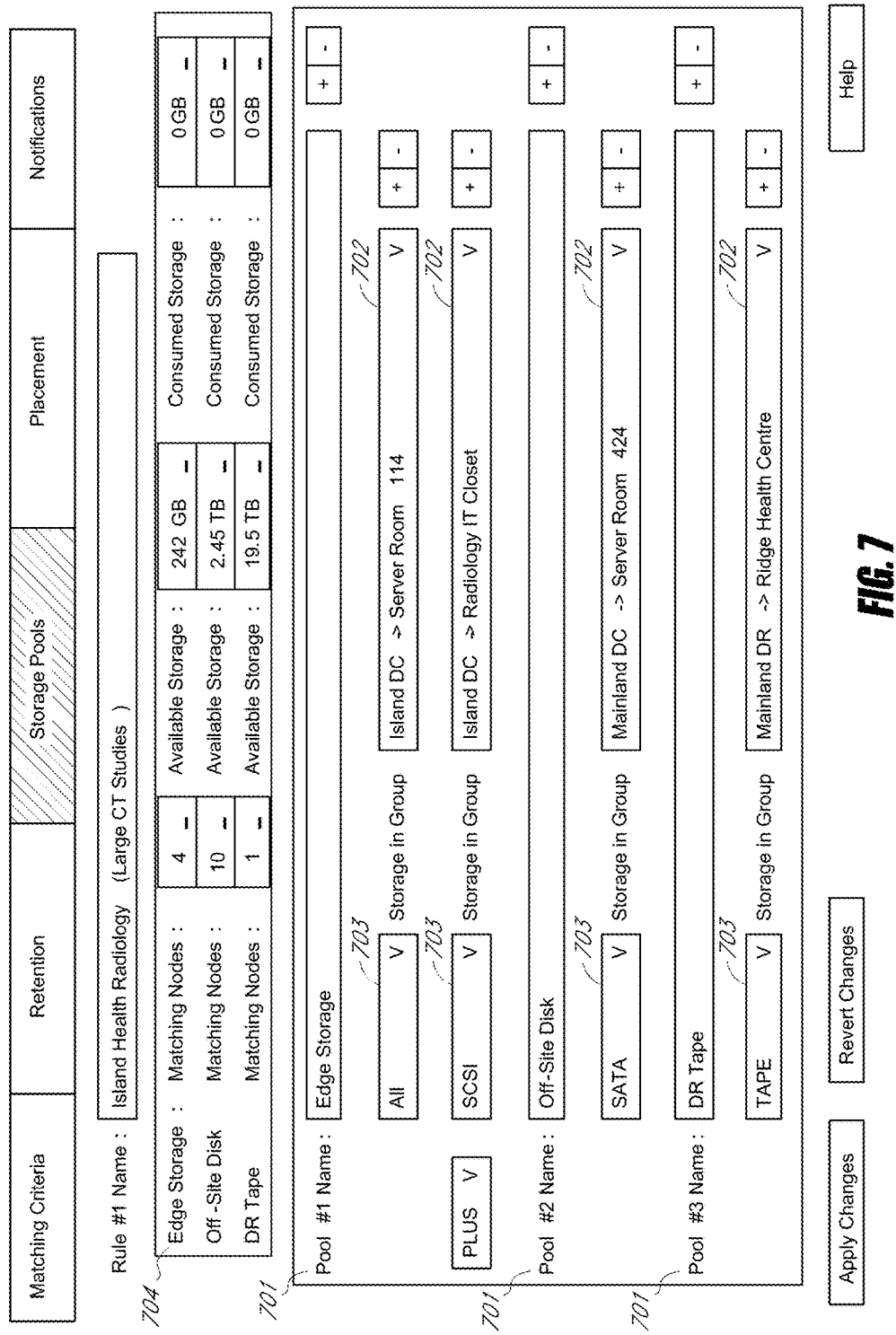
FIG. 7 depicts an example user interface for grouping storage servers into storage pools.

An exemplary user interface for specifying the storage pools for a given rule is shown in FIG. 7.

For each defined pool, information about the topology that matches and the amount of resources that are currently available can be displayed 704.

Each pool may be given a name 701 and may be associated with one or more storage device groups 702. By using topology information about the storage system, storage devices can be displayed using the configured names with meaning to the user, for example, "Island DC" being a organizational group, with "Server Room 114" being a sub-group in the hierarchy. Additionally, the Storage Grade 703 may be specified.

The pool name 701 allows an administrator to specify a user-defined name relevant to their business organization, such as "Tier 1 Storage/North". Storage Grade 703 allows them to specify only a given class of storage resources, and Group 702 allows them to restrict the topological location of the storage resources.

It is possible to have multiple Storage Grade/Group rows per pool, allowing, for example, both Storage Grades SATA and SAS in a given group, or allowing SATA across two or more groups.

In some embodiments, the system includes "Alternate" storage pools, where objects can be stored when certain characteristics are met on the preferred storage pools. This allows the explicit time/placement model to be extended to perform traditional capacity-based hierarchical storage management.

Figure 8:
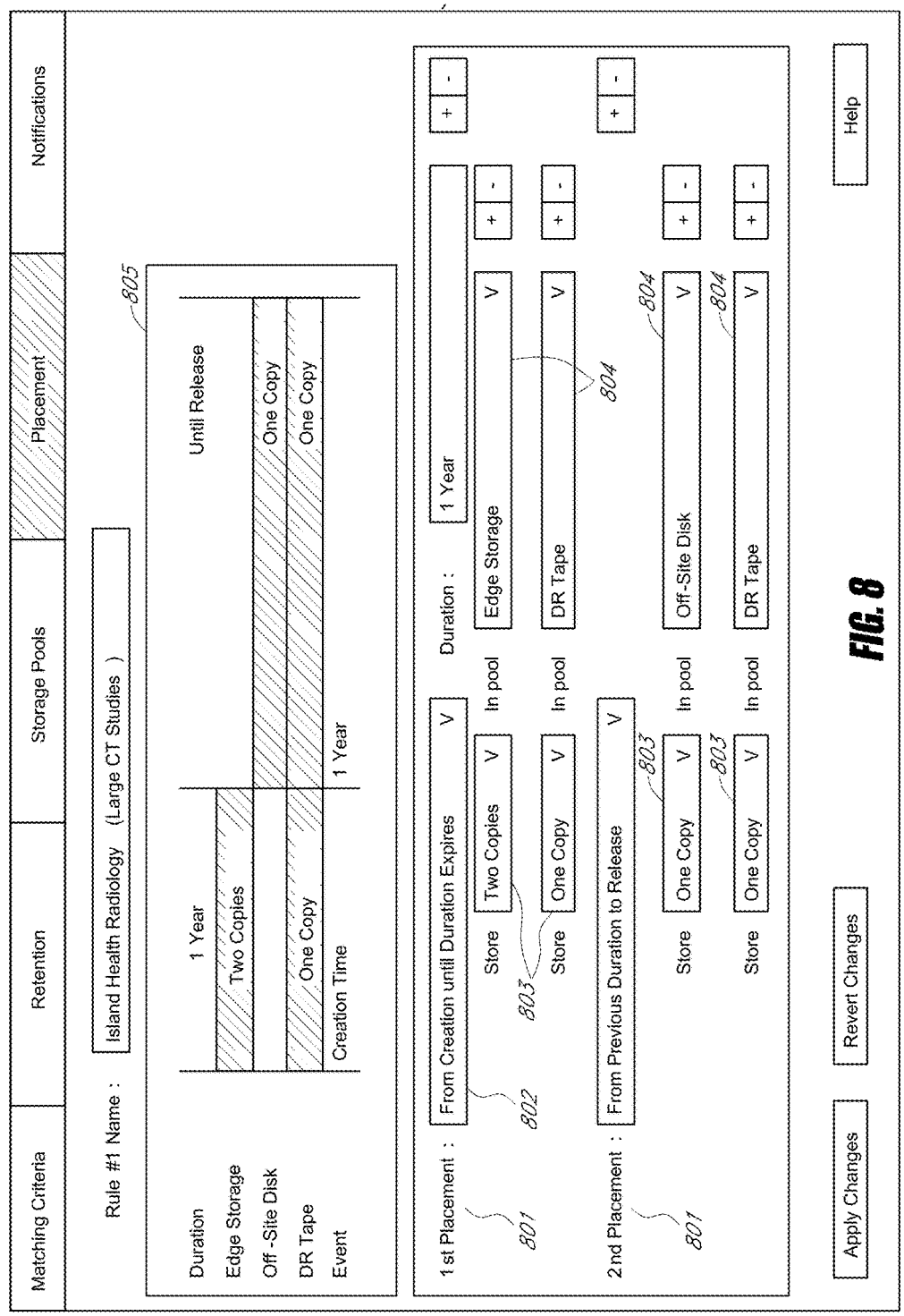
FIG. 8 depicts an example user interface for specifying the storage pools and number of copies to store for a placement rule.

An example of a possible user interface for specifying the placement of storage over time into the defined pools is shown in FIG. 8.

A diagram 805 is rendered in the UI to give the administrator a visual representation of the placement of content over time. Additionally, this or other interfaces may indicate what changes to the system topology are required to satisfy this or other rules over time, or the storage devices or other resources required to satisfy this or other rules over time, based on the storage pools selected in this interface.

Multiple placement specifications, or "epochs," 801 can be defined, each with a different placement. The starting and ending time of an epoch 802 can be defined, as can the number of copies in each pool during an epoch 803 and the pool in which objects will be placed 804.

Epoch times can be defined based on ingest time, time based on metadata in the object, or from other sources. Epochs can also be bounded by transitions from one class of rules to another. Some rules may be for content that is managed (has handles outstanding), is not on hold, etc. As these mutable attributes of objects change, rules can transition from one set of rules to another.

In some embodiments, the interface also allows the user to specify a Reference Time, which may be, for example, the ingest time, a time based on metadata in the object, the last access time, or a time from other sources. The Reference Time area allows users to indicate what the epoch beginning should be for the rule. This is used to control when content placement changes over time.

Figure 9:
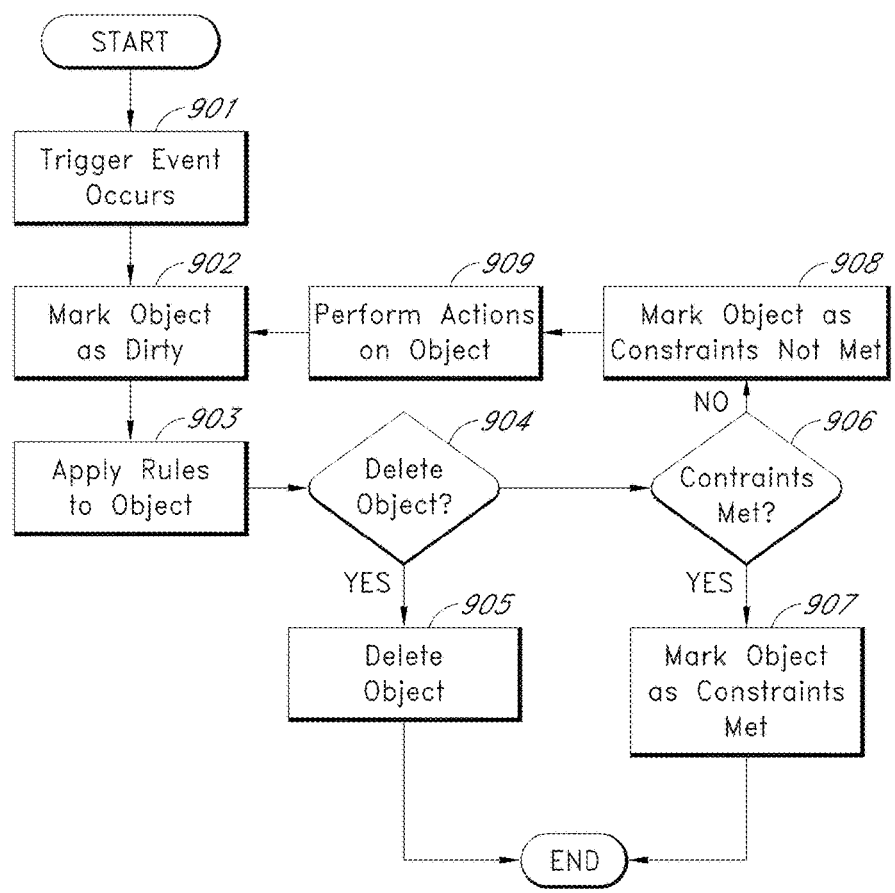
FIG. 9 is a flowchart illustrating one possible process by which an object is placed within the grid in accordance with placement rules.

The flowchart in FIG. 9 illustrates the algorithm performed by some embodiments of the rule execution module 104. The algorithm begins when a trigger event 901 occurs. In some embodiments, the following types of events may trigger the system to evaluate an object against the defined rules: an instance of an object is created, an instance of an object is accessed, an instance of an object is destroyed, an instance of an object ceases to exist, an instance of an object is found to exist, an instance of an object's existence is viewed to be questionable, rules known to affect the object are changed, rules possibly affecting the object are changed (eg, when the order of rules are changed), an external system requests a re-evaluation of the rules associated with an object, an attempt to change the placement of objects fails, the metadata of an object changes, the contents of an object changes, the topology of the storage devices changes, the characteristics of the storage devices change, or a timed trigger fires.

Once a trigger event occurs, the object is placed in the "dirty" state and queued for object evaluation 902. In some embodiments, queuing objects is done in two steps: first, the object is queued for evaluation, and then the objects in that queue are moved into a second queue as they are evaluated. In some embodiments, the rules evaluation triggers a notification to be sent to one or more external systems. The object is matched against a specific rule 903, which determines the action to take on the object. If the rule requires the object to be deleted 904, then the object is deleted 905. The constraints of the rule's placement specification are compared against the object's current placement on the grid 906. If the rule's placement is met, the object transitions to the "Constraints Met" state 907. If the rule's placement is not met, then the object transitions to the "Constraints Not Met" state 908.

In the "Constraints Not Met" state, a computation is performed using the rule's placement specification, the object's current placement, and the grid topology, and a proposed action is determined that, if successful, will bring the placement closer to the rule's placement specification. In some embodiments, this proposed action is calculated by determining an ideal placement for the object given the rule's placement specification; determining an achievable placement by considering the object's current placement, the ideal placement, the grid topology, and other information about the grid; and calculating a set of proposed actions needed to transform the object's current placement into the achievable placement. In some embodiments, an alert or alarm is produced to inform users when the ideal placement and the achievable placement do not match. This alarm may inform users as to the reasons the ideal and achievable placements do not match, such as unavailability of network resources or insufficient storage resources.

A proposed action is then selected from the set of actions. In some embodiments, the proposed action may be selected based on system resources, by prioritizing the set of actions and selecting the action of highest priority. Such prioritization may also be designed to either maximize or minimize the degree of replication after the proposed action is executed, or to follow other safety placement destinations optionally specified in the placement specification of the rule. Additionally, in some embodiments actions may be batched together to be performed as a single action, or actions may be performed in parallel if they are determined to be parallelizable.

In some embodiments, the calculations for ideal placement, achievable placement, set of actions, and proposed action may have their results cached, so as to avoid redundant calculation.

The proposed action is then taken 909 and the object is placed in the "dirty" state 902 for further evaluation. If no actions can be performed to bring the object closer to the desired state, the object is kept in the "Constraints not met" state for deferred evaluation. This may happen when the topology is such that no actions can be performed to bring the current placement closer to the desired placement.

If objects cannot be placed in the desired locations, they may be held in a pending queue awaiting changes to the topology that may allow the desired locations to be reached.

In the "Constraints met" state, an object will not be processed again unless a trigger event occurs, such as when placement changes are specified in the rules, or when one of the events listed above moves the object into the "dirty" state.

In some embodiments, the rule that was applied to an object is associated with the object. Thus, it is possible to collect a set of objects associated with any particular rule. Additionally, the metadata of this set of objects associated with a rule can be indexed, to produce a metadata index associated with the rule. This is useful for efficiently identifying objects that require updating when a rule is added or modified. First, the rules that are lower in priority or rank than the added or modified rule are identified. Next, for each lower-priority rule, its associated objects are retrieved, along with the metadata index. Using the index and the matching criteria specification of the added or modified rule, it is possible to quickly extract a subset of objects that will be affected by the added or modified rule. For each object in this subset, a rules changed trigger is invoked, so that rules evaluation is performed on the object.

Figure 10:
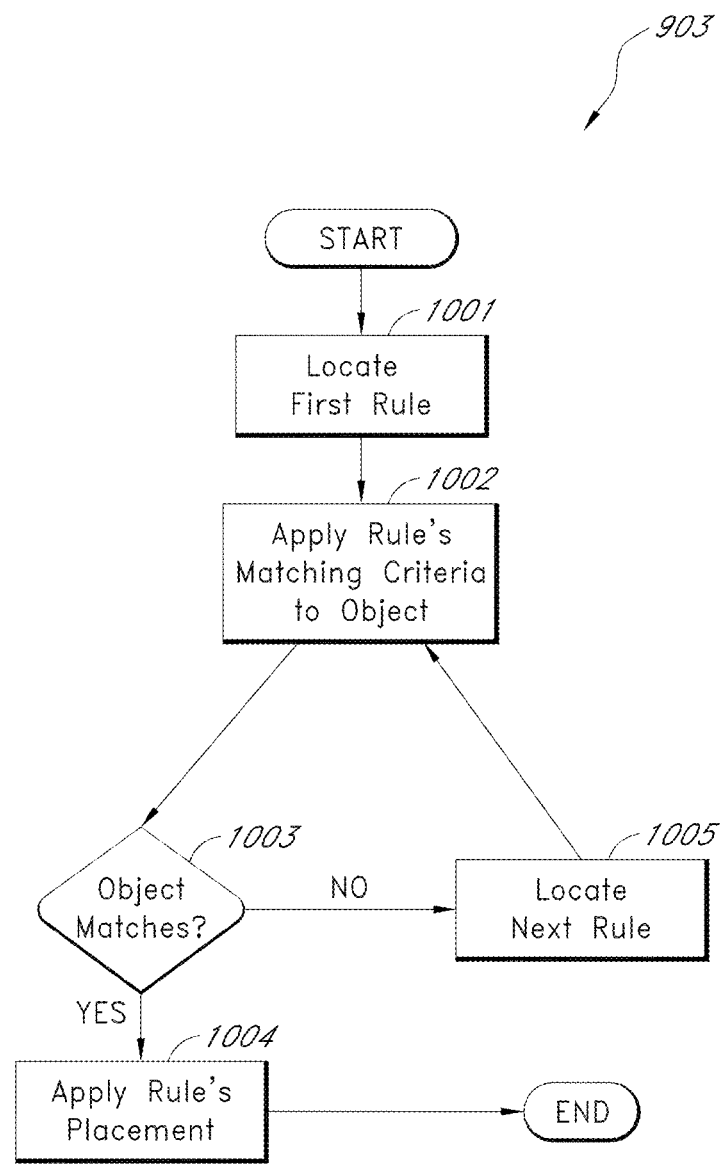
FIG. 10 is a flowchart of one possible process for choosing the appropriate rule to apply to a given object.

The flowchart in FIG. 10 presents the method of applying rules to an object 903 used in some embodiments of the invention. The rules are taken from the set of rules 102. First, a first rule is located 1001, from the set of rules 102. Next, the rule's matching criteria are applied to the object 1002. Where the matching criteria are in the form of a tree such as that of FIG. 4, some embodiments might apply the matching criteria to the object by assessing the logical value of each logical function of the matching criteria and combining those values in accordance with the logical operators of the matching criteria. Other algorithms for applying matching criteria to an object will be known to those skilled in the art, and may depend on the form of the matching criteria.

The above described application of the matching criteria to the object produces a logical value 1003. If the object does match, then the placement specifications 302 of the rule are applied to the object. Otherwise, the next rule in the set of rules 102 is selected, and the algorithm is continued at step 1002 with this next rule. In some embodiments, every set of rules 102 has a default last rule that always matches, thus guaranteeing that at least one rule will match any object.

Figure 11:
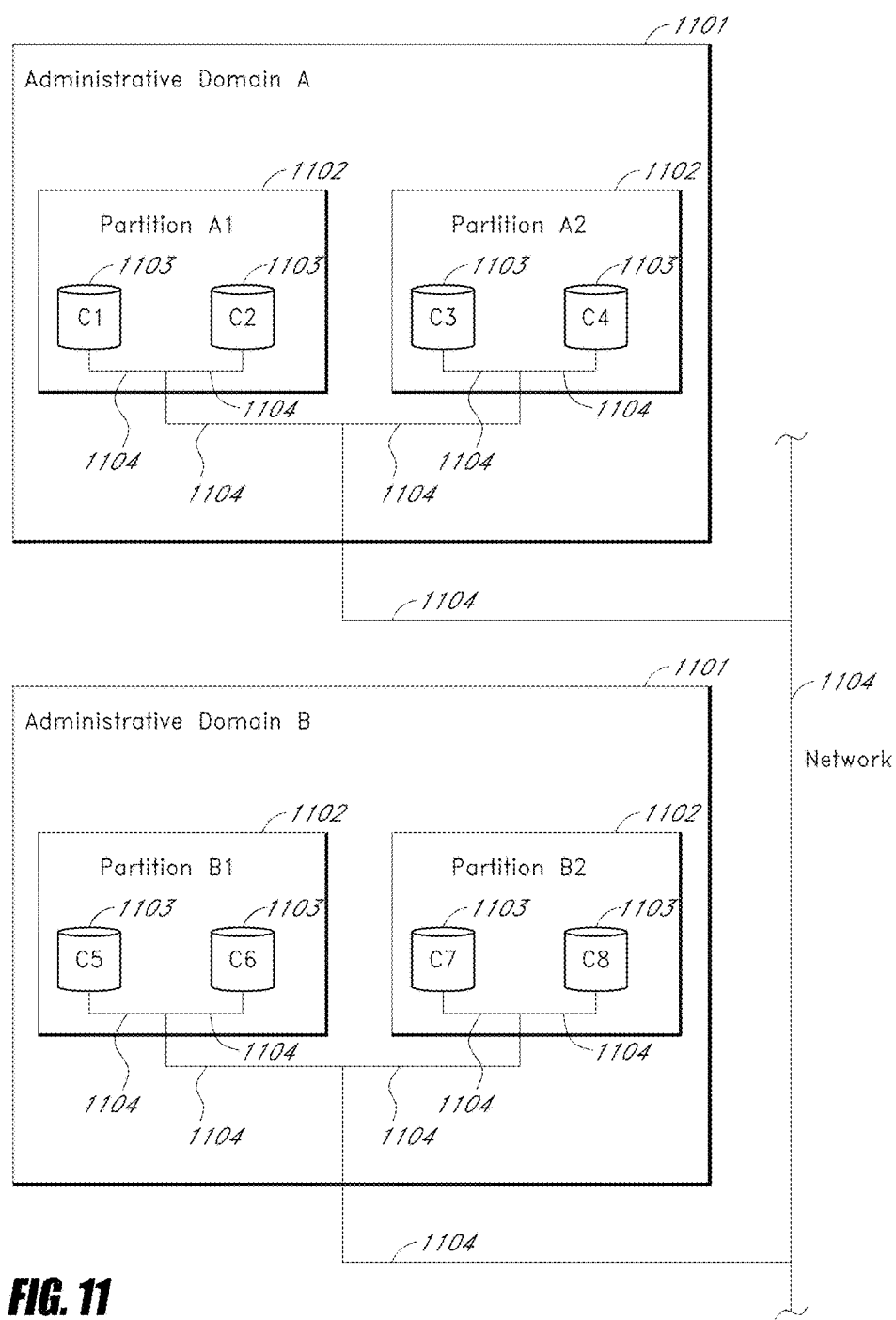
FIG. 11 depicts administrative domains and partitions within a grid.

In some embodiments, the storage system may be separated, as depicted in FIG. 11, into Administrative Domains 1101, which may be further subdivided into partitions 1102. Rules belong to a given Administrative Domain. Each Administrative Domain is logically isolated from each other, and there is no user visibility into rules associated with other administrative domains. In some embodiments, objects are associated with an Administrative Domain based on their location of ingest. Other criteria may determine the Administrative Domain with which an object is associated, such as the Administrative Domain of the user who produced the object.

Administrative Domains are intersecting or non-intersecting subsets of the grid topology that are managed by a given administrative entity. When an administrator authenticates to the Network Management System under a given Administrative Domain, that user will only see the resources that belong to that Administrative Domain. In some embodiments, a Network Management System may only receive management information from Nodes that belong to a single Administrative Domain. In these configurations, Administrative Domain Controllers may be associated with a given Administrative Domain to provide increased scalability, and each Administrative Domain will have one or more independent Configuration Management Nodes.

The second level of scope is the partition 1102. Every ingested object is associated with a partition, and each partition exists within a single Administrative Domain. Objects may be associated with a partition just as they are associated with an Administrative Domain, and object metadata may indicate which administrative domain and partition they are associated with. One or more rules can be defined for all partitions, a subset of partitions, or for a specific partition, and in some embodiments, the ranking order of rules is defined at the partition level. In some embodiments, each partition includes a default rule that defines the object management behaviour when no other rules match. This default rule may be ranked as the lowest priority.

In some embodiments, each client 1103 belongs to a single partition for the purposes of object storage and is connected via a network 1104. This network may comprise an internal Local Area Network, a Virtual Private Network, a set of computers connected via the Internet, or other similar systems known to those skilled in the art. For the purposes of query and retrieval, a given client may belong to more than partition.

Administrative Domains and partitions may also be used to limit users' abilities to modify rules. In some embodiments, a user may be limited to a subset of the existing Administrative Domains on a grid, and any rules that user creates or modifies will only affect objects within those Administrative Domains. In other embodiments, the user may be limited to a subset of partitions, and any rules that user creates or modifies will only affect objects within those partitions.

In one embodiment, the system described herein runs on several computing devices. Moreover, in some embodiments, the features of the system are available via a fully-hosted application service provider that manages and provides access to the system, for example, via a web interface or other interface. In other embodiments, the system may be available via partially hosted ASPs or other providers. In additional embodiments, the system may be accessed through a broad assortment of interface channels, including XML, fixed format data inquiry, batch or a comprehensive and easy-to-use web browser user interface. In yet further embodiments, the system may be a customer-side installed solution and may be included and/or in direct communication with one or more third party systems.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In some embodiments, the computing devices include and/or communicate with a database module or data source. The database module or data source may be implemented using one or more databases, such as a relational database, such as Sybase, Oracle, CodeBase and Microsoft® SQL Server as well as other types of databases, such as, for example, a flat file database, an entity-relationship database, and object-oriented database, and/or a record-based database.

In one embodiment, each of the computing devices are IBM, Macintosh, or Linux/Unix compatible. In another embodiment, the computing devices comprise a server, a laptop computer, a cell phone, a personal digital assistant, a kiosk, an interactive voice response device, a voice response unit, or an audio player, for example. In one embodiment, the computing devices include one or more CPUs, which may each include microprocessors. The computing devices may further include one or more memory devices, such as random access memory (RAM) for temporary storage of information and read only memory (ROM) for permanent storage of information, and one or more mass storage devices, such as hard drives, diskettes, or optical media storage devices. In one embodiment, the modules of the computing are in communication via a standards based bus system, such as bus systems using Peripheral Component Interconnect (PCI), Microchannel, SCSI, Industrial Standard Architecture (ISA) and Extended ISA (EISA) architectures, for example. In some embodiments, components of the computing devices communicate via a network, such as a local area network that may be secured.

The computing devices are generally controlled and coordinated by operating system software, such as the Windows 95, Windows 98, Windows NT, Windows 2000, Windows XP, Windows Vista, Linux, SunOS, Solaris, PalmOS, Blackberry OS, or other compatible operating systems. In Macintosh systems, the operating system may be any available operating system, such as MAC OS X. In other embodiments, the computing devices may be controlled by a proprietary operating system. Conventional operating systems control and schedule computer processes for execution, perform memory management, provide file system, networking, and I/O services, and provide a user interface, such as a graphical user interface ("GUI"), among other things.

The computing devices may include one or more commonly available input/output (I/O) devices and interfaces, such as a keyboard, mouse, touchpad, microphone, and printer. Thus, in one embodiment the computing devices may be controlled using the keyboard and mouse input devices, while in another embodiment the user may provide voice commands to the computing devices via a microphone. In one embodiment, the I/O devices and interfaces include one or more display device, such as a monitor, that allows the visual presentation of data to a user. More particularly, a display device provides for the presentation of GUIs, application software data, and multimedia presentations, for example. The computing devices may also include one or more multimedia devices, such as speakers, video cards, graphics accelerators, and microphones, for example.

In one embodiment, the I/O devices and interfaces provide a communication interface to various external devices and the communications medium via wired or wireless communication links. For example, the computing devices may be configured to communicate with the communications medium using any combination of one or more networks, LANs, WANs, or the Internet, for example, via a wired, wireless, or combination of wired and wireless communication links.

Various components of the above described embodiments of the invention involve determination of the topology of the grid. Such determination may be performed by the methods disclosed in US Patent Application Nos. 2008/0140947 or 2008/0126404, which are hereby incorporated by reference, or by other methods known to those skilled in the art.

All references cited herein are intended to be incorporated by reference. Although the present invention has been described in terms of specific embodiments, it is anticipated that modifications and alterations to the invention will be apparent to those of ordinary skill in the art. It is thus intended that the above disclosure be construed as illustrative of embodiments of the invention and not restrictive of the invention, and that the scope of the invention be determined by the claims.

What is claimed is:

1. A method comprising:
    determining a system topology of a distributed storage grid comprising a plurality of storage devices for storing a plurality of objects;
    presenting, using the system topology, configuration options for one or more rules;
    presenting a first user interface for specifying, for each rule of the one or more rules, one or more matching criteria, wherein the one or more matching criteria is specified as a set of logical functions using logical operators for comparing specified parameters with at least one of an object metadata value, an object duration value, an object status value, and a value contained in contents of an object of the plurality of objects, wherein presenting the first user interface comprises presenting a dynamic estimate representing how each of the one or more rules impact the system topology;
    presenting a second user interface for specifying, for each rule of the one or more rules, one or more placement constraints, each placement constraint of the one or more placement constraints specifying a storage device of the plurality of storage devices in which an object should be placed within the system topology;
    creating at least one data structure summarizing the one or more rules based on the one or more matching criteria and the one or more placement constraints;
    incorporating the one or more rules summarized in the at least one data structure into any previously existing rules to form updated rules;
    distributing the updated rules across the system topology;
    indexing metadata for an existing set of objects in the distributed storage grid to identify objects within the system topology which are affected by the updated rules; and
    triggering reevaluation of the identified objects to move the identified objects to a different location within the system topology based on the updated rules.

2. The method of claim 1, wherein at least one placement constraint of the one or more placement constraints specifies a number of copies of the object to store in the storage device.

3. The method of claim 1, wherein at least one placement constraint of the one or more placement constraints specifies a time period that the object is retained in the storage device.

4. The method of claim 1, wherein at least one rule of the one or more rules applies to an object in a defined object state.

5. The method of claim 1, wherein the existing set of objects are assigned to a partition, wherein each partition is associated with an isolated administrative domain, and wherein the one or more rules are associated with one or more partitions.

6. The method of claim 1, wherein presenting the second user interface for specifying the one or more placement constraints comprises presenting an estimated number of objects matching the rule, an estimated amount of storage space consumed by the objects matching the rule, and an estimated amount of storage space available for new objects matching the rule.

7. The method of claim 1, wherein a storage grade is defined for each of the plurality of storage devices, wherein the storage grade comprises a type and a class, wherein at least one placement constraint of the one or more placement constraints specifies the storage grade of the storage device where the object that matches the rule for the at least one placement constraint are to be stored.

8. One or more non-transitory machine-readable storage media having program code for specifying one or more rules that control storage of a plurality of objects stored therein, the program code comprising instructions to:
    determine a system topology of a distributed storage grid comprising a plurality of storage devices;
    present, using the system topology, configuration options for one or more rules;
    present a first user interface for specifying, for each rule of the one or more rules, one or more matching criteria, wherein the one or more matching criteria is specified as a set of logical functions using logical operators for comparing specified parameters with at least one of an object metadata value, an object duration value, an object status value, and a value contained in contents of an object of the plurality of objects, wherein the program code comprising instructions to present the first user interface comprises program code comprising instructions to present a dynamic estimate representing how each of the one or more rules impact the system topology;
    present a second user interface for specifying, for each rule of the one or more rules, one or more placement constraints, each placement constraint of the one or more placement constraints specifying a storage device of the plurality of storage devices in which an object should be placed within the system topology;
    create at least one data structure summarizing the one or more rules based on the one or more matching criteria and the one or more placement constraints;
    incorporate the one or more rules summarized in the at least one data structure into any previously existing rules to form updated rules;
    distribute the updated rules across the system topology;
    index metadata for an existing set of objects in the distributed storage grid to identify objects within the system topology which are affected by the updated rules; and
    trigger reevaluation of the identified objects to move the identified objects to a different location within the system topology based on the updated rules.

9. The one or more non-transitory machine-readable storage media of claim 8, wherein at least one placement constraint of the one or more placement constraints specifies a number of copies of the object to store in the storage device.

10. The one or more non-transitory machine-readable storage media of claim 8, wherein at least one placement constraint of the one or more placement constraints specifies a time period that the object is retained in the storage device.

11. The one or more non-transitory machine-readable storage media of claim 8, wherein at least one rule of the one or more rules applies to an object in a defined object state.

12. The one or more non-transitory machine-readable storage media of claim 8, wherein the existing set of objects are assigned to a partition, wherein each partition is associated with an isolated administrative domain, and wherein the one or more rules are associated with one or more partitions.

13. The one or more non-transitory machine-readable storage media of claim 8, wherein the program code comprising instructions to present the second user interface for specifying the one or more placement constraints comprises program code comprising instructions to present an estimated number of objects matching the rule, an estimated amount of storage space consumed by the objects matching the rule, and an estimated amount of storage space available for new objects matching the rule.

14. The one or more non-transitory machine-readable storage media of claim 8, wherein a storage grade is defined for each of the plurality of storage devices, wherein the storage grade comprises a type and a class, wherein at least one placement constraint of the one or more placement constraints specifies the storage grade of the storage device where the object that matches the rule for the at least one placement constraint are to be stored.

15. An apparatus comprising:
a processor; and
a non-transitory machine-readable medium having program code executable by the processor to cause the apparatus to,
determine a system topology of a distributed storage grid comprising a plurality of storage devices for storing a plurality of objects;
present, using the system topology, configuration options for one or more rules;
present a first user interface for specifying, for each rule of the one or more rules, one or more matching criteria, wherein the one or more matching criteria is specified as a set of logical functions using logical operators for comparing specified parameters with at least one of an object metadata value, an object duration value, an object status value, and a value contained in contents of an object of the plurality of objects, wherein the program code executable by the processor to cause the apparatus to present the first user interface comprises program code executable by the processor to cause the apparatus to present a dynamic estimate representing how each of the one or more rules impact the system topology;
present a second user interface for specifying, for each rule of the one or more rules, one or more placement constraints, each placement constraint of one or more placement constraints specifying a storage device of the plurality of storage devices in which an object should be placed within the system topology;
create at least one data structure summarizing the one or more rules based on the one or more matching criteria and the one or more placement constraints;
incorporate the one or more rules summarized in the at least one data structure into any previously existing rules to form updated rules;
distribute the updated rules across the system topology;
index metadata for an existing set of objects in the distributed storage grid to identify objects within the system topology which are affected by the updated rules; and
trigger reevaluation of the identified objects to move the identified objects to a different location within the system topology based on the updated rules.

16. The apparatus of claim 15, wherein at least one placement constraint of the one or more placement constraints specifies a number of copies of the object to store in the storage device.

17. The apparatus of claim 15, wherein at least one placement constraint of the one or more placement constraints specifies a time period that the object is retained in the storage device.

18. The apparatus of claim 15, wherein at least one rule of the one or more rules applies to an object in a defined object state.

19. The apparatus of claim 15, wherein the existing set of objects are assigned to a partition, wherein each partition is associated with an isolated administrative domain, and wherein the one or more rules are associated with one or more partitions.

20. The apparatus of claim 15, wherein the program code executable by the processor to cause the apparatus to present the second user interface for specifying the one or more placement constraints comprises program code executable by the processor to cause the apparatus to present an estimated number of objects matching the rule, an estimated amount of storage space consumed by the objects matching the rule, and an estimated amount of storage space available for new objects matching the rule.

21. The apparatus of claim 15, wherein a storage grade is defined for each of the plurality of storage devices, wherein the storage grade comprises a type and a class, wherein at least one placement constraint of the one or more placement constraints specifies the storage grade of the storage device where the object that matches the rule for the at least one placement constraint are to be stored.

* * * * *